United States Patent
Winn et al.

(10) Patent No.: US 9,251,467 B2
(45) Date of Patent: Feb. 2, 2016

(54) PROBABILISTIC PARSING

(71) Applicant: Microsoft Corporation, Redmond, WA (US)

(72) Inventors: John Michael Winn, Cambridge (GB); Thomas Minka, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 284 days.

(21) Appl. No.: 13/783,349

(22) Filed: Mar. 3, 2013

(65) Prior Publication Data
US 2014/0250046 A1  Sep. 4, 2014

(51) Int. Cl.
*G06F 17/27* (2006.01)
*G06N 5/04* (2006.01)

(52) U.S. Cl.
CPC ............. *G06N 5/04* (2013.01); *G06F 17/277* (2013.01); *G06F 17/2715* (2013.01); *G06F 17/2775* (2013.01)

(58) Field of Classification Search
CPC ..................................... G06N 5/04
See application file for complete search history.

(56) References Cited

U.S. PATENT DOCUMENTS

| | | |
|---|---|---|
| 6,262,730 B1 | 7/2001 | Horvitz et al. |
| 6,556,960 B1 | 4/2003 | Bishop et al. |
| 6,556,964 B2 | 4/2003 | Haug et al. |
| 6,691,122 B1 | 2/2004 | Witte et al. |
| 7,050,868 B1 | 5/2006 | Graepel et al. |
| 7,200,563 B1 | 4/2007 | Hammitt et al. |
| 7,685,144 B1 * | 3/2010 | Katragadda ............ 707/999.101 |
| 8,103,598 B2 | 1/2012 | Minka et al. |
| 2003/0033288 A1 * | 2/2003 | Shanahan et al. ................. 707/3 |
| 2003/0097252 A1 | 5/2003 | Mackie |

(Continued)

FOREIGN PATENT DOCUMENTS

WO  WO0070481  11/2000

OTHER PUBLICATIONS

Angeli, et al., "Parsing Time: Learning to Interpret Time Expressions", In Proceedings of the Conference of the North American Chapter of the Association for Computational Linguistics: Human Language Technologies, Jun. 3, 2012, 10 pages.

(Continued)

*Primary Examiner* — Alan Chen
(74) *Attorney, Agent, or Firm* — Steve Wight; Judy Yee; Micky Minhas

(57) ABSTRACT

Probabilistic parsing is described for calculating information about the structure of text and other ordered sequences of items to enable downstream systems such as machine translation systems, information retrieval systems, document classification systems and others to use the structure information. In various embodiments, a parsing inference component comprises inference algorithm(s) compiled from a probabilistic program which defines a stochastic process for generating text or other ordered sequences of items. In examples, the parsing inference component receives one or more observations or examples of text that are compatible with the stochastic process defined by the probabilistic program. The parsing inference component may apply the inference algorithms to the text to update one or more probability distributions over strings or other values relevant to the parse. In some examples, the parsing inference component uses the inference results to complete partial examples to assist a user with information retrieval tasks.

20 Claims, 9 Drawing Sheets

(56) References Cited

U.S. PATENT DOCUMENTS

| | | | |
|---|---|---|---|
| 2005/0198563 A1* | 9/2005 | Kristjansson | 715/507 |
| 2006/0010090 A1 | 1/2006 | Brockway et al. | |
| 2006/0294037 A1 | 12/2006 | Horvitz et al. | |
| 2007/0273558 A1 | 11/2007 | Smith et al. | |
| 2009/0216911 A1* | 8/2009 | Long | 710/2 |
| 2013/0212475 A1* | 8/2013 | Lee et al. | 715/261 |
| 2014/0207748 A1* | 7/2014 | Sood et al. | 707/706 |

OTHER PUBLICATIONS

Ross, Brian J., "Probabilistic Pattern Matching and the Evolution of Stochastic Regular Expressions", In Journal of Applied Intelligence, vol. 13, Issue 3, Nov. 2000, 16 pages.

Johnson, Mark, "Learning and Parsing Stochastic Unification-based Grammars", In Proceedings of 16th Annual Conference on Computational Learning Theory and 7th Kernel Workshop, Aug. 24, 2003, 13 pages.

Verdu-Mas, et al., "Parsing with Probabilistic Strictly Locally Testable Tree Languages", In Proceedings of IEEE Transactions on Pattern Analysis and Machine Intelligence, vol. 27, Issue 7, Jul. 2005, 11 pages.

Niehues, Jan, "Current Parsing Techniques", Available at: http://breton.babbylon.de/media/termpapers/Current%20Parsing%20Techniques.pdf. Mar. 31, 2005. 19 pages.

Winn, 'Variational message passing and its applications',2004, University of Cambridge. 149 pages.

Minka,'An image browser database that learns from user interaction',1996, MIT media lab. 56 pages.

Minka, 'A family of algorithms for approximate Bayesian inference', 2001, MIT. 75 pages.

Murphy, K. 'A brief introduction to graphical models and Bayesian networks', 1998. 19 pages.

Murphy, K. 'Software for graphical model',A review, Dec. 2007. 3 pages.

Bishop, et al., Vibes, 'A Variational Inference Engine for Bayesian Networks, Advances in Neural Information Processing Systems', vol. 15, 2002, pp. 793-800.

Daume III, Hal. HBC: Hierarchical Bayes Compiler, Apr. 9, 2008 , pp. 1-3.

Korb, et al., 'Software Packages, Appendix B in Bayesian Artificial Intelligence', 2004, pp. 317-331.

Minka, et al., Infer.NET, Jul. 16, 2008, Microsoft Research Cambridge, pp. 1-2.

Murphy, 'Software for Graphical Models' A Review, ISBA Bulletin, Dec. 2007, pp. 1-3.

Koike, Carla et al. Project e-motion, Apr. 10, 2008, pp. 1-6.

Terry et al., 'A Bayesian Net Inference Tool for Hidden State in Texas Hold'em Poker' Apr. 9, 2008. 13 pages.

UnBBayes, on Apr. 10, 2008, SourceForge.net, pp. 1-2.

Winn, at al., CSOFT: 'Probablistic modelling in C#, retrieved on Jul. 16, 2008, Microsoft Research Cambridge, p. 1.

Winn et al., 'Expectation Propagation & Variational Message Passing a comparison using Infer.Net', NIPS '07 Workshop on Approximate Bayesian Inference in Continuous/Hybrid Models, Dec. 7, 2007.

"International Search Report & Written Opinion for PCT Patent Application No. PCT/US2014/018461", Mailed Date: Sep. 3, 2014, 11 Pages.

Singh, et al., "Bi-Directional Joint Inference for Entity Resolution and Segmentation Using Imperatively-Defined Factor Graphs", In Proceedings of the European Conference on Machine Learning and Knowledge Discovery in Databases: Part II, Sep. 7, 2009, pp. 414-429.

Naradowsky, et al., "Grammarless Parsing for Joint Inference", In Proceedings of Coling 2012, Technical Papers, Dec. 2012, pp. 1995-2010.

Thollard, et al., "Shallow Parsing Using Probabilistic Grammatical Inference", In Proceedings of the 6th International Colloquium on Grammatical Inference: Algorithms and Applications, Sep. 23, 2002, pp. 269-282.

Lafferty, et al., "Conditional Random Fields: Probabilistic Models for Segmenting and Labeling Sequence Data", In Proceedings of the Eighteenth International Conference on Machine Learning, Jun. 28, 2001, pp. 282-289.

Rohanimanesh, et al., "Inference and Learning in Large Factor Graphs with Adaptive Proposal Distributions and a Rank-based Objective", in CMPSCI Technical Report UM-CS-2009-008, May 26, 2009, 16 Pages.

"International Preliminary Report on Patentability Issued in PCT Application No. PCT/US2014/018461", Mailed Date: Jun. 19, 2015, 8 Pages.

"Second Written Opinion Issued in PCT Application No. PCT/US2014/018461", Mailed Date: Mar. 25, 2015, 7 Pages.

* cited by examiner

|   | A | B | C | D |
|---|---|---|---|---|
| 0 |   | was born on |   |   |
| 1 | Barack Obama | 4 August 1961 |   |   |
| 2 | George W. Bush | 6 July 1946? |   |   |
| 3 | Bill Clinton | 19 August 1946 ? |   |   |
| 4 | Ronald Reagan | 6 February 1911? |   |   |
| 5 | Jimmy Carter | 1 October 1924? |   |   |
| 6 | Harry Truman? | 8 May 1884 |   |   |

500

19 August 1946 (4)
example one
details
example two
details
example three
details
example four
details 19 August 1945 (1)
example one
details

PROBABILISTIC PARSING

COPYRIGHT NOTICE

A portion of the disclosure of this patent contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Parsing can be thought of as a process of finding structure in text or other ordered sequences of items. A grammar or other rules which may have been used to generate the text may be available and used to find the structure; or the grammar itself may need to be found. However, parsing unstructured text is a very challenging task because of the variety of ways in which people can express themselves using text and the natural ambiguity of language.

Because large amounts of information are available only in the form of unstructured text (such as most information available on the Internet), accurate, fast and cost effective ways of parsing that unstructured text are needed in order to enable automated systems such as information retrieval systems, document classification systems, machine translation systems and other systems to make use of that information.

Some previous parsing approaches have involved manually writing large amounts of machine learning code, which is time consuming, difficult to understand and maintain and bug-prone.

Classifiers trained using large amounts of labeled training data may be used to extract information from unstructured text. However, obtaining the labeled training data is typically expensive and time consuming and, once trained, the classifier does not adapt to changing use of language, such as new words or phrases.

Some previous parsing approaches have used regular expressions to analyze text. However, regular expressions are difficult to use by novice users and are defined using a limited language, so do not allow rich and complex parsing processes to be defined, for example, the parse cannot depend on non-textual cues.

The embodiments described below are not limited to implementations which solve any or all of the disadvantages of known systems for parsing text and other ordered sequences of items.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Probabilistic parsing is described for calculating information about the structure of text and other ordered sequences of items to enable downstream systems such as machine translation systems, information retrieval systems, document classification systems and others to use the structure information. In various embodiments, a parsing inference component comprises inference algorithm(s) compiled from a probabilistic program which defines a stochastic process for generating text or other ordered sequences of items. In examples, the parsing inference component receives one or more observations or examples of text that are compatible with the stochastic process defined by the probabilistic program. The parsing inference component may apply the inference algorithms to the text to update one or more probability distributions over strings or other values relevant to the parse. In some examples, the parsing inference component uses the inference results to complete partial examples to assist a user with information retrieval tasks.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 6 is a schematic diagram of another example display at the graphical user interface of FIG. 3;

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an information retrieval system, the system described is provided as an example and not a limitation. As those skilled in the art will appreciate, the present examples are suitable for application in a variety of different types of systems which use text or other ordered sequences of items.

Figure 1:
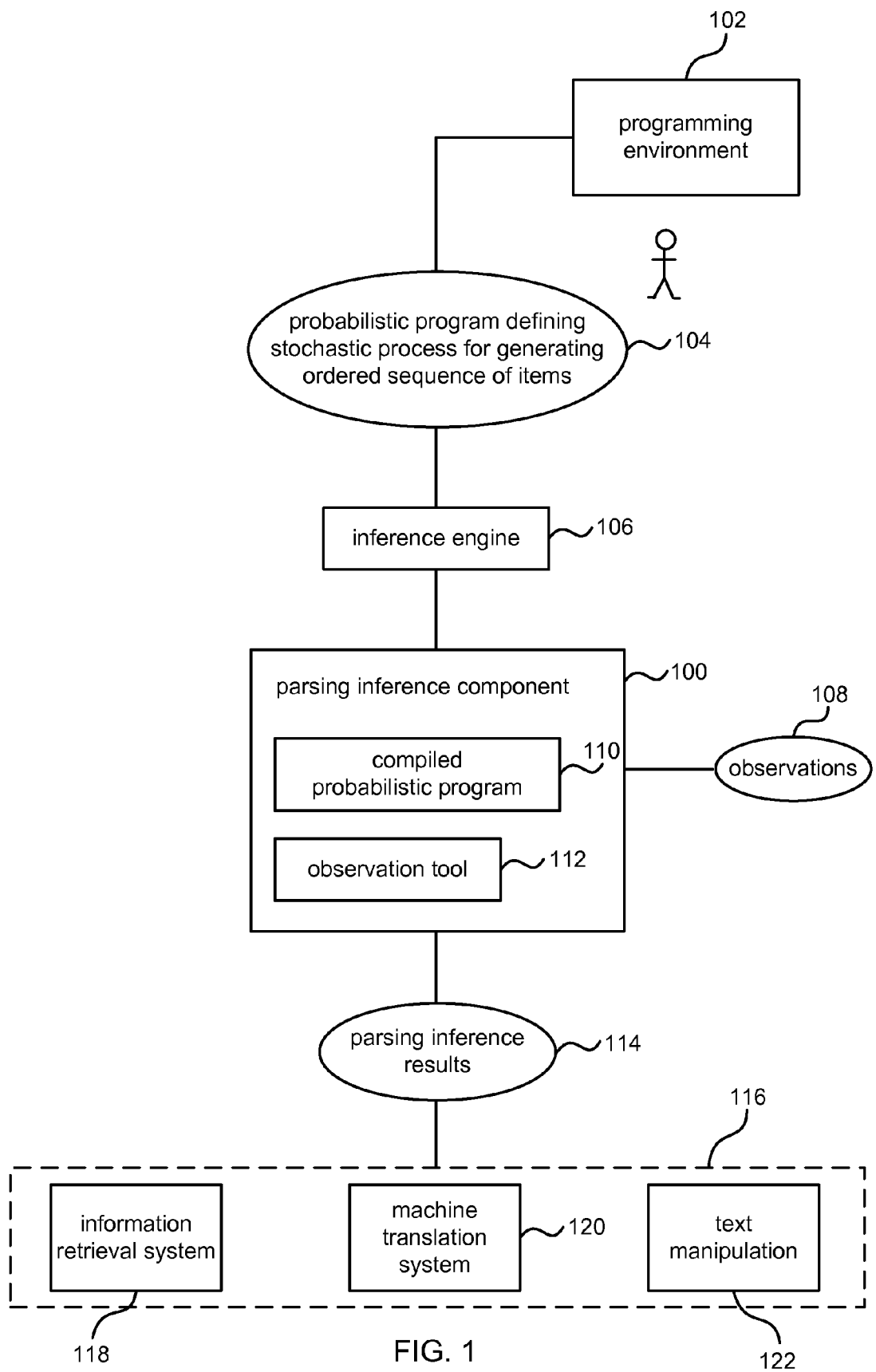
FIG. 1 is a schematic diagram of a parsing inference component for generating parsing inference results.

FIG. 1 is a schematic diagram of a parsing inference component for generating parsing inference results. The parsing inference component is computer-implemented using software and/or one or more hardware logic components. It comprises a compiled probabilistic program 110 and optionally an observation tool 112 for accessing and obtaining observations 108. The language used to define the probabilistic program may be a standard programming language (or a subset of a standard programming language) having string manipulation methods. Observations 108 are examples of text or other ordered sequences of items compatible with any requirements specified in the probabilistic program. Ordered sequences of items may be sequences of characters where the items are characters, lists of names where the items are peoples' names, lists of schools where the items are schools, or lists of items of other types. The observations 108 may be partial or incomplete examples in some cases as described in more detail below. The parsing inference component 100 carries out inference using the compiled probabilistic program 110 and the observations 108 to produce parsing inference results 114. For example, the parsing inference results 114 comprise probability distributions of variables in the probabilistic program, where at least one of the variables is a string or another ordered sequence of items. The probability distributions may initially be set to default probability distributions and may be updated by applying the observations 108. As more observations 108 are gained and applied using the parsing inference component the parsing inference results 114 become more accurate and provide greater information about the structure of text or other ordered sequences of items.

In this way probabilistic parsing is achieved as probability distributions are learnt which describe how a grammar, rules or operations are used to generate text or other ordered sequences of items. This is achieved without the need for large amounts of labeled training data and without the use of regular expressions or a separate language for dealing with text. Information from parts of the probabilistic program not dealing with strings may be easily used to improve the accuracy of parsing since variables which are probability distributions over strings may be used in the same program with variables of other types.

The parsing inference results 114 may be passed to another system 116 such as an information retrieval system 118, a machine translation system 120, a text manipulation system 122 or others. An example where the parsing inference results 114 are used in information retrieval is described later in this document.

The compiled probabilistic program 110 comprises inference algorithms derived by an inference engine 106. For example, the inference engine may comprise a probabilistic compiler as described in U.S. Pat. No. 8,103,598 "Compiler for Probabilistic Programs", Minka et al., issued on 24 Jan. 2012, assigned to Microsoft Corporation, where that compiler is extended to deal with probabilistic programs which include declarations or references to random variables represented using probability distributions over ordered sequences of items. Probabilistic programs may comprise declarations or references to random variables of type double, integer, Boolean; the extended compiler may enable random variables of type string and list to be supported in addition.

Figure 2:
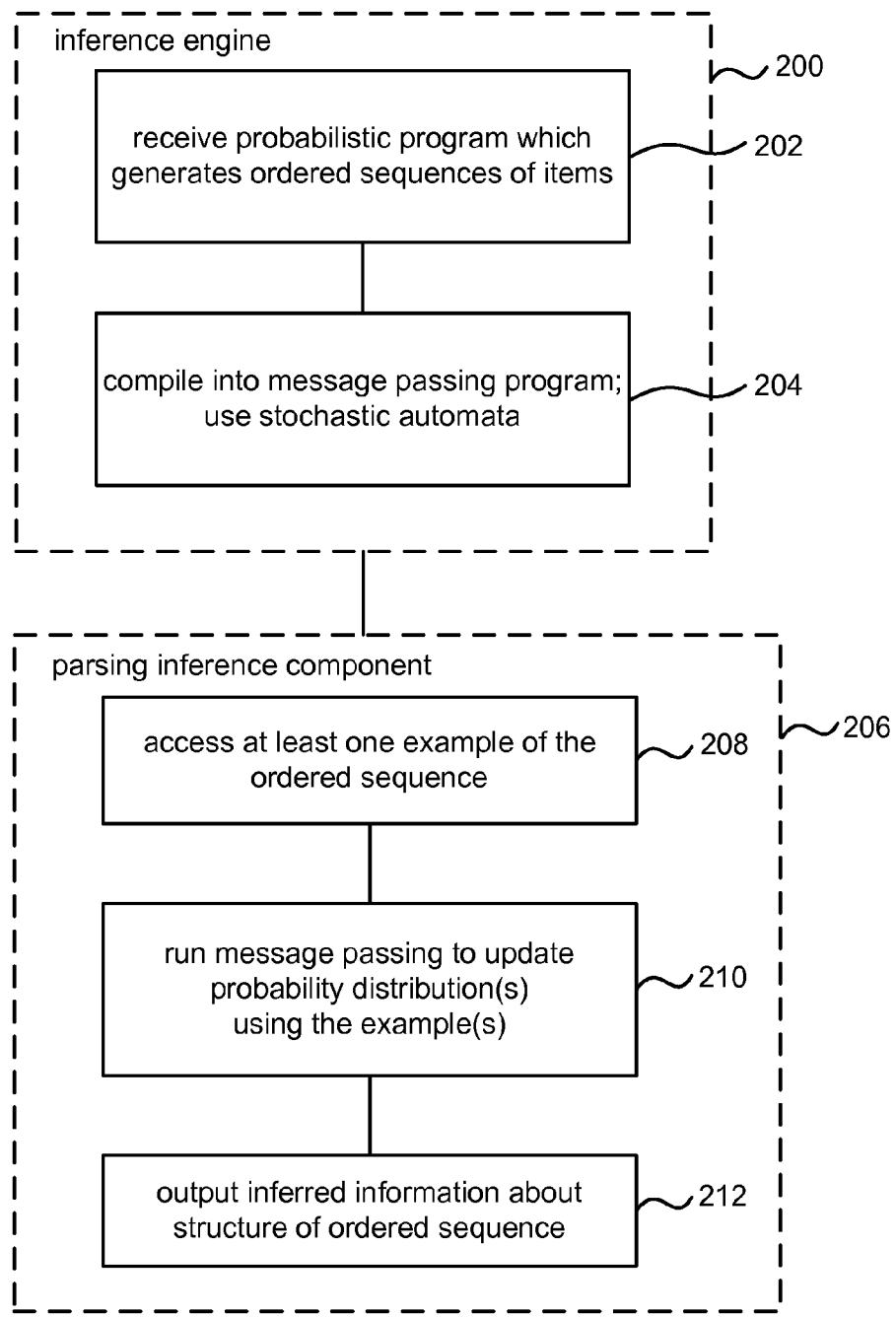
FIG. 2 is a flow diagram of an example method at an inference engine and/or a parsing inference component.

With reference to FIGS. 1 and 2, a probabilistic program is received 202 at the inference engine. For example, a user may operate a programming environment to create the probabilistic program. It is also possible for the parsing inference component to automatically generate the probabilistic program according to structure of incoming data (this is described in more detail with reference to FIG. 3). In examples where the parsing inference component dynamically generates the probabilistic program, it sends the probabilistic program to the inference engine for compilation and receives a compiled form of the probabilistic program in return comprising message passing algorithms.

The probabilistic program defines a stochastic process for generating an ordered sequence of items. For example, the items are characters and the ordered sequence of items is text. The process is stochastic because it comprises variables with uncertain values that can only be expressed as distributions, such as distributions over ordered sequences of items. For example, in the case of text, a variable may have a uniform probability distribution over strings which are people's first names (and so take a particular form where the first character is a capital letter selected from a known alphabet and subsequent characters are lower case characters selected from the known alphabet). As another example, the variable may take a more complex distribution which reflects the relative frequency of different first and last names.

In an example, the probabilistic program may define the stochastic process for generating the ordered sequence of items by using one or more operations that may be applied to ordered sequences of items from a plurality of available operations. For example, to generate text by using an operation on strings such as for formatting one or more strings, finding the length of a string, concatenating two or more strings, creating an index of strings, finding an initial character of a string, finding an end character of a string, finding substrings of a string, inserting one or more characters into a string, replacing a string, removing characters from the end or start of a string and others. These operations are in addition to the standard language operations available, such as loops, switches, if statements, array indexing and so on.

In examples, an operation for generating an ordered sequence of items may take one or more arguments, which themselves may be written as ordered sequences of items and expressed using probabilistic variables. For example, an operation to format a plurality of strings may take arguments which comprise references to the plurality of strings and a template indicating how the strings are to be formatted. The template is itself a string and its value may be expressed as a probability distribution over strings. This enables the parsing inference component to learn possible templates by making inference using examples of observed texts.

The probabilistic program 104 may be represented using a factor graph comprising a plurality of nodes (variable nodes and factor nodes) connected by edges. A variable node represents a variable in the probabilistic program. A factor node represents an operation in the probabilistic program and is connected to the variables which are arguments of that operation or the return value of that operation.

The factor graph also provides a data structure for computation of the inference results. Messages, in the form of probability distributions over variables, are passed in both directions along the edges of the graph. At each variable node, these messages are used to update a probability distribution representing the value of the variable, where it is stored. At each factor node, the messages outgoing from the factor are computed from the messages received by that factor. These computations may be referred to as message operators. Message passing algorithms pass messages in forwards and/or reverse directions (or in any other directions according to the pattern of inputs) over the factor graph to perform inference whereby the probability distributions are updated.

As mentioned above the inference engine 106 comprises a probabilistic compiler. This compiler comprises one or more databases of message operators. The complier takes the probabilistic program 104 and compiles 204 it by deriving inference algorithms, which may also be referred to as message passing algorithms, to produce the compiled probabilistic program 110. The compiler accesses appropriate specified message operators from the databases of message operators and sequences these to form inference algorithms. For example, an operation such as formatting a plurality of strings may have one or more associated message operators which are to be used.

The message operators may be implemented using stochastic transducers which update probability distributions represented using stochastic automata. A stochastic automata is a finite state machine where nodes representing states of a process or entity are connected by edges representing probabilities for transitions between states and labelled with probability distributions over the elements of the sequence, for example, distributions over characters.

For example, to represent a probability distribution over strings which are people's names, a stochastic automaton with nodes for the characters in the name and edges showing probabilities for moving from the first character to the second character and so on through the name may be used. This is described in more detail below with reference to FIG. 8. A stochastic transducer takes a similar form to a stochastic automaton except that its edges are labelled with an input and an output distribution over elements, either of which may be null (epsilon). A stochastic transducer can be applied to an input stochastic automaton to produce an output stochastic automaton. Importantly, transducers are also reversible so that given an output automaton, the transducer can also derive the input automaton accounting for any uncertainty in reversing the process. Hence, a stochastic transducer may be used to implement a message operator for messages in either the forward or reverse direction, and so form part of the computation to update a probability distribution over strings for example.

The parsing inference component accesses 208 at least one example of an ordered sequence compatible with the probabilistic program. An example (such as a string) is compatible with the probabilistic program if it could have been generated according to the process defined by the probabilistic program. The parsing inference component runs 210 message passing to update probability distributions of variables of the probabilistic program using the example. Inferred information may then be output 212 about the structure of the ordered sequence.

In the example of FIG. 2 the inference engine 200 is shown as carrying out the compilation step and the parsing inference component 206 carries out the inference. However, it is also possible for the inference engine to carry out the compilation and the inference in some examples. It is also possible for the inference engine and the parsing inference component to be integral.

Some examples of probabilistic programs which may be used in compiled form at the parsing inference component are now given. In these examples, lines which begin with the symbol "//" comprise comments and not instructions that are part of the program.

In a first example a probabilistic program comprises variables "string a" and "string b" which are both random variables and so their values are represented using probability distributions over strings. In the program, they are given uniform prior distributions, indicating that no information about the string is known. The standard string operation called "String.Format" is used to format the two strings together and a variable "string c" takes the result of the format operation. The format operation concatenates the strings (in the order a b) with a space in between the strings, and adds two exclamation marks at the end. The variable "c" is further constrained to be equal to a particular observed result. In this example, the observed result is "Hello Uncertain World!!". The parsing inference component uses the observed result to carry out inference and update the probability distributions of variables a and b as described above.

//Create two uncertain strings
string a=Strings.Uniform( )
string b=Strings.Uniform( )
//Format the two strings together
string c=String.Format("{0} {1}!!", a, b);
//Observe the result
constrain(c=="Hello Uncertain World!!");
In this example the resulting distribution over "a" is:
UniformOver("Hello Uncertain","Hello")
And the distribution over "b" is:
UniformOver("Uncertain World","World")

The parsing inference component is able to provide parsing inference results which in this case comprise information about the probability distributions over variable a and variable b. For example, the probability distribution over variable a is a uniform distribution over two possible strings which are "Hello Uncertain" and "Hello". The probability distribution over variable b is a uniform distribution over two possible strings which are "Uncertain World" and "World". This example illustrates how the parsing inference component is able to use observations to make inferences about how text is to be parsed according to a probabilistic process for generating text specified in a probabilistic program.

As mentioned above, an operation for generating an ordered sequence of items may take one or more arguments, which themselves may be operations written as ordered sequences of items and so expressed using probabilistic variables. An example of this is now given.

A probabilistic program comprises variables "string a" and "string b" which are both uniform probability distributions over strings. A variable "string template" is given a distribution over all strings containing "{1}" surrounded by non-word characters, such as a space or an exclamation mark. The standard string operation called "String.Format" is used to format the template output and the two strings together. A variable "string c" takes the result of the format operation.

string a=Strings.Uniform( )
string b=Strings.Uniform( )
//Uncertain template
string template=Strings.Uniform( )+Chars.NonWord( )+"{1}"+Chars.NonWord( )+Strings.Uniform( )
//Format the two strings together
string c=String.Format(template, a, b);
//Observe the inputs and outputs
constrain(a=="Hello");
constrain(c=="Hello Uncertain World!!");

In this example, the observed result is "Hello Uncertain World!!" for the output variable c and "Hello" for the variable a. The parsing inference component uses the observed results to carry out inference and update the probability distributions of variables b and template as described above. In this example the distribution over the variable template is a uniform distribution over three possible strings as follows:
Uniformr("{0} Uncertain {1}!!", "{0} {1} !!", "{0} {1} World!!")

In this example the three possible strings give alternative ways of combining the argument strings a and b into the observed string. In this way the program has been used to learn possible formatting operations that may be used to produce the observed strings.

In this example the output string and an argument to the format operation were observed and the template distribution was inferred. Other combinations are possible. For example, the template may be observed and inference used to update the probability distributions of the arguments to the format operation as in the first example discussed above. It is also possible to observe the template and a subset of the arguments in order to obtain an uncertain result string.

As mentioned above, information from parts of the probabilistic program not dealing with strings may be easily used to improve the accuracy of parsing since string variables may be used in the same program with variables of other types. This is illustrated in the following example which takes as input a list of strings and learns a template which will output those strings with the first part of the string "C:\\" stripped off. The input and output strings are specified as follows:
string[ ]inputs={"C:\\Users", "C:\\Tools"};
string[ ]outputs={"Users", "Tools"};

A variable for a start point is defined as "int start" which is a uniform distribution over integers. A variable for an end point is defined as "int end" which is a uniform distribution over integers. The start point is a number of characters from one end of a string, counting from the right hand side of the string for negative integers and counting from the left hand side of the string for positive integers.
//Start and end points (-ve for chars from RHS)
int start=Ints.Uniform( )
int end=Ints.Uniform( )
//Loop over input/output pairs
for(int i=0; i<inputs.Length; i++) {outputs[i]=inputs[i].Substring(start,end);}

The program loops over the input output pairs and creates outputs by applying a substring operation (which takes a substring of a given string using the given start and end points within the string). Some possible values for the variables start and end are already observed from the list of inputs and outputs. These observations are used to make inference and update the probability distributions for the variables start and end. In this example, the distribution over the variable "start" becomes a uniform distribution over the two possible integers −6 and 3. The distribution over the variable "end" becomes a uniform distribution over the two possible integers −1 and 8.

If another observation is received which is that the input string "C:\\System" becomes "System" then this observation may be used to carry out inference and update the probability distribution for the variable start to a point mass for the integer 3 and to update the probability distribution for the variable end to a point mass for the integer −1.

Figure 3:
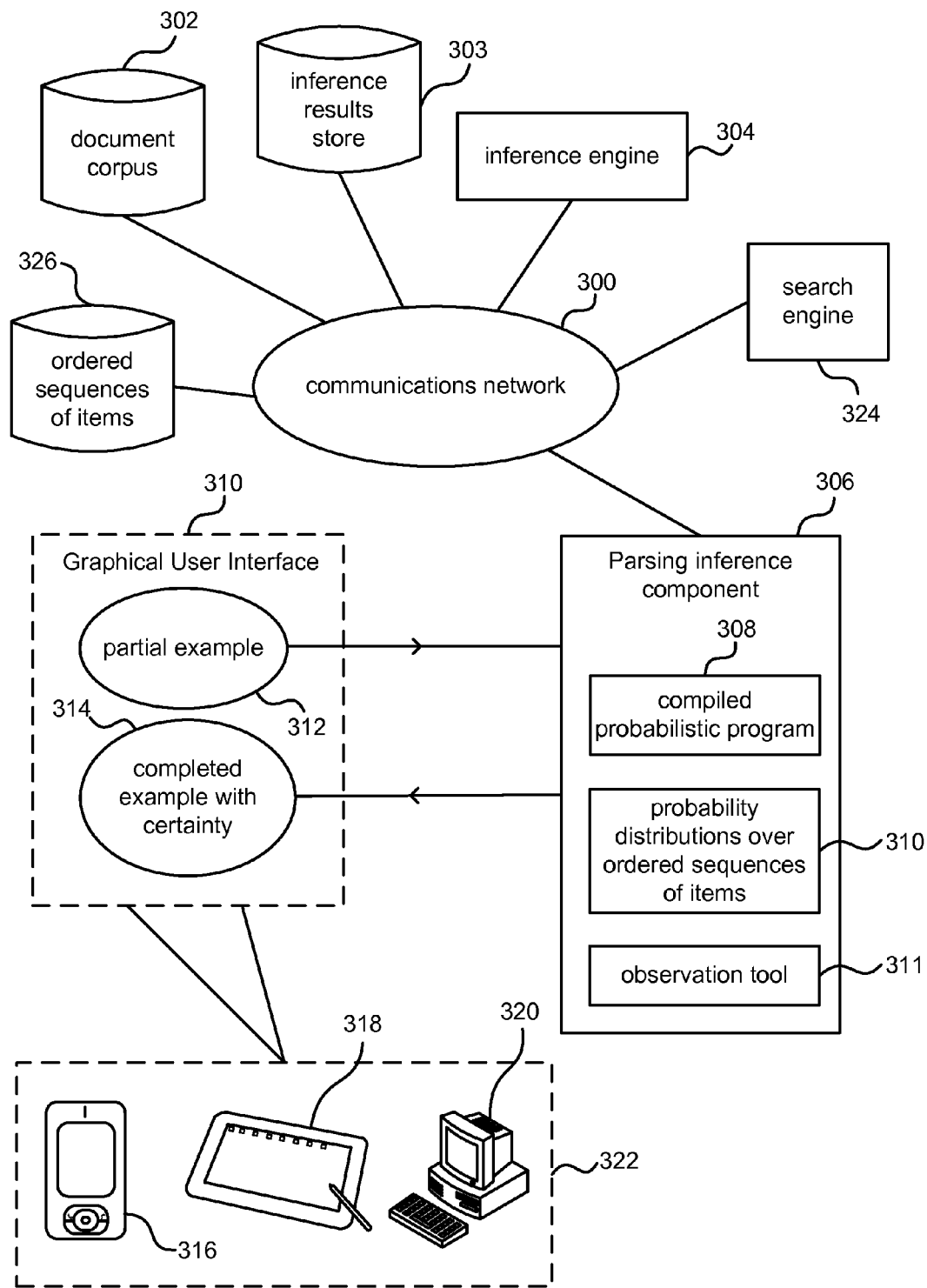
FIG. 3 is a schematic diagram of the parsing inference component of FIG. 1 used for completing partial examples.

Examples in which the parsing inference component is used to complete partial text or other incomplete examples, and to give certainty information of the completed information are now given with reference to FIG. 3.

FIG. 3 shows a parsing inference component 306 such as the parsing inference component 100 of FIG. 1. It has a compiled probabilistic program 308 such as the compiled probabilistic program 110 of FIG. 1 produced by inference engine 304 as described above with reference to inference engine 106 of FIG. 1. Parsing inference results in the form of probability distributions 310 may be stored at the parsing inference component or at another location accessible to the parsing inference component. For example, parsing inference results may be stored at inference results store 303 in communication with the parsing inference component 306 via a communications network 300.

An end user is able to use the parsing inference component 306 using a graphical user interface 310 accessible from his or her computing device 322 such as a phone 316, tablet computer 318 or personal computer 320. The graphical user interface 310 may be web-based or may be of any other suitable type. Examples of graphical user interface displays which may be provided are discussed later with reference to FIGS. 5 and 6. The graphical user interface 310 may be provided by the parsing inference component 306 or by any other entity in communication with the parsing inference component 306. By using the graphical user interface the end user is able to make use of the power of probabilistic inference even if he or she has no training in statistics or machine learning.

In some examples the parsing inference component and the graphical user interface are provided as part of application software for manipulating grids of data. For example, application software for displaying and manipulating rows and columns of cells forming a data grid, where the cells may contain numerical values and/or text. The application software for displaying and manipulating data grids may be stored at the computing device 322 or at another entity in communication with the computing device 322.

An observation tool 311 at the parsing inference component 306 may be provided to obtain observations of text or other ordered sequences which conform to requirements specified by the probabilistic program. The observations may be of non-string variables in the probabilistic program. The observations may be obtained from one or more entities such as document corpus 302, a database of ordered sequences of items 326, the inference results store 303, or other sources in communication with the parsing inference component 306 via a communications network 300. The observations may be obtained by the observation tool 311 working with a search engine 324 which is able to access observation sources such as document corpus 302. The observations may also be input by a user at graphical user interface 310 or in other ways. In this way, existing sources of observations (such as documents) may be used without the need to export data and manipulate that data before carrying out machine learning and inference. Also, the end user does not need to pre-process data, for example, to transform variables of different types or remove examples with missing data. This simplifies operation for the end user.

The end user may input, using the graphical user interface 310, a partial example 312 to the parsing inference component 306. The parsing inference component 306 returns data (such as text) to complete the partial example together with information about how certain the data is. For example, a partial example may comprise a column or row of a data grid where some of the cells of the row or column are empty and one or more cells of the row or column are filled. The parsing inference component 306 may return text to complete the empty cells and to indicate how certain the completed text is. A partial example may be referred to as an object which is a data structure comprising a plurality of property values where at least one of the property values is unknown and at least one of the property values is known. A property value may be an ordered sequence of items such as a string. A property value may not be an ordered sequence of items, for example, it may be a date which is not in string form. Where a property value is not an ordered sequence of items, it may be converted into an ordered sequence of items by the probabilistic program. For example, a data which is not in string form may be converted to string form.

Even though the observation sources (e.g. document corpus 302) comprise unstructured text, the parsing inference component is able to make use of these sources by using the parsing inference results. Also, because the observation sources (e.g. document corpus 302) may be located in the cloud large amounts of unstructured text may be available to the parsing inference component where those amounts may be larger than an amount of text which may practically and/or usefully be displayed at an end user device 322 in a graphical user interface 310. By using large amounts of unstructured text at the parsing inference component the accuracy and certainty of predictions made by the parsing inference component may be increased.

Figure 4:
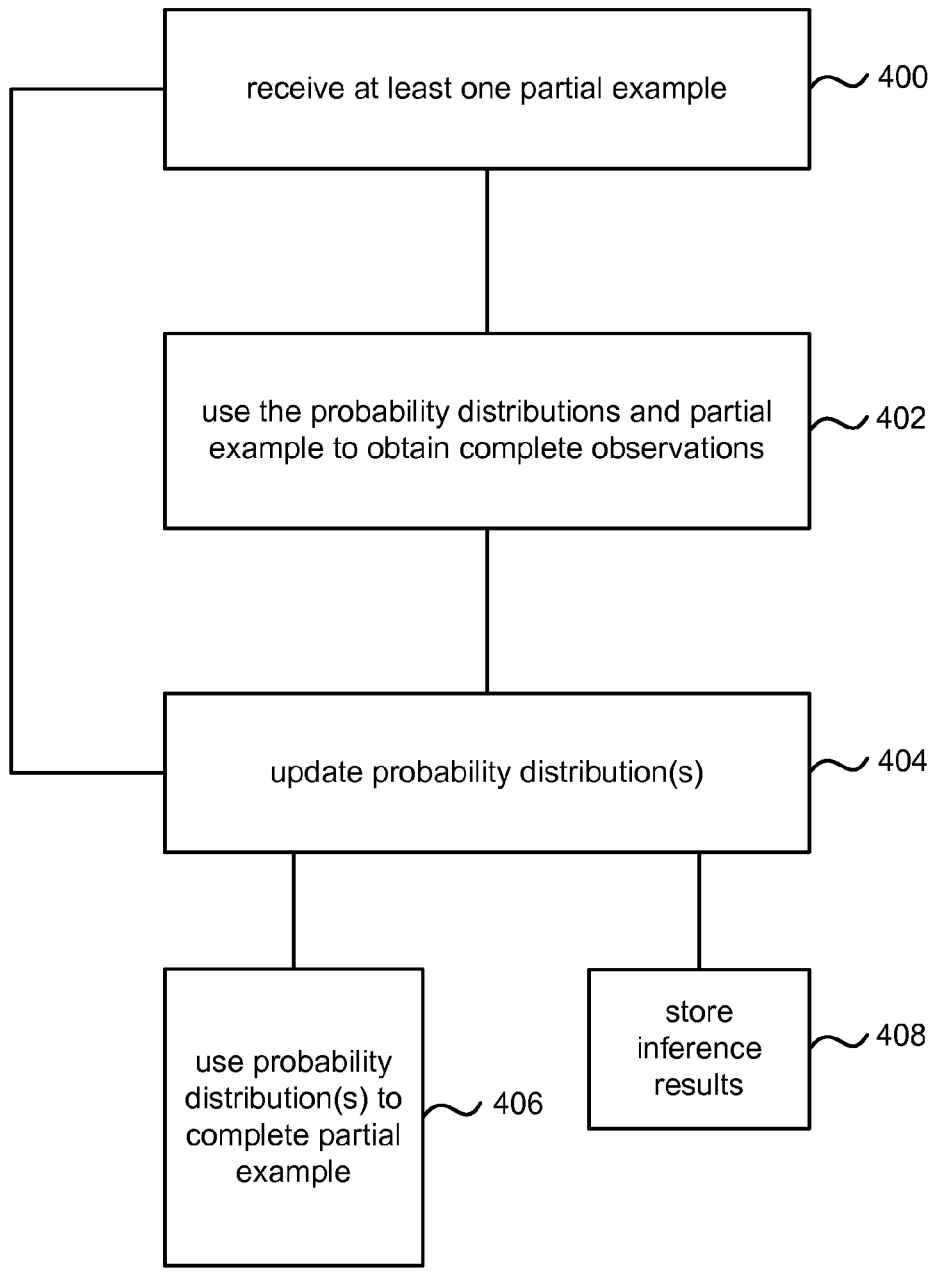
FIG. 4 is a flow diagram of a method at the parsing inference component of FIG. 3.

FIG. 4 is a flow diagram of a method at the parsing inference component 306 of FIG. 3. At least one partial example is received 400. For example, the partial example may be received from a graphical user interface 310 as a result of user input. If the compiled probabilistic program specifies that text is to be generated by combining the string form of a plurality of uncertain values each represented by a probability distribution, a partial example may be instances of a subset of such uncertain values.

The parsing inference component 306 uses the current probability distributions it has representing the structure of the ordered sequence of items to obtain 402 complete observations. For example, the observation tool generates queries to send to the search engine 324. The queries are generated using the current probability distributions. The search engine returns lists of documents in response to the queries. The observation tool finds text in those documents which is of a form compatible with the compiled probabilistic program for generating text. That text is extracted by the observation tool and forms the complete observations. The addresses of the documents from which the text is extracted may be stored by the observation tool together with the extracted text and optionally other information such as, text neighboring the extracted text, a title of the document or other information.

The parsing inference component uses the complete observations obtained by the observation tool to update 404 the probability distributions. This is achieved by carrying out inference by passing messages using the compiled probabilistic program. The updated probability distributions are used to complete the partial example 406 and provide certainty information of the completed text. The inference results may also be stored 408.

Figure 5:
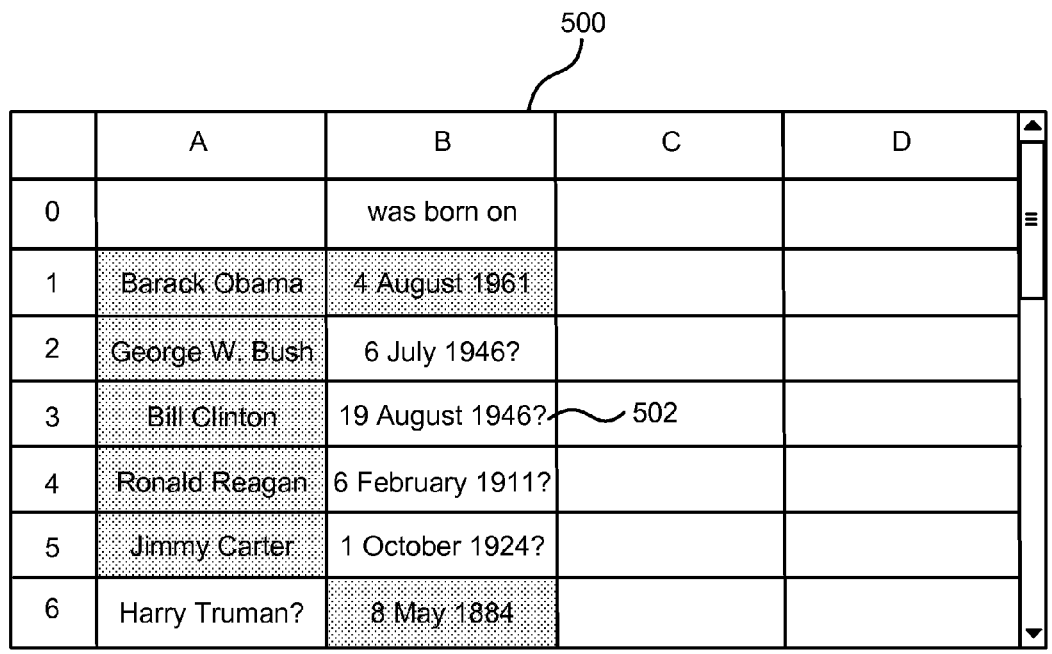
FIG. 5 is a schematic diagram of an example display at the graphical user interface of FIG. 3.

FIG. 5 is a schematic diagram of an example graphical user interface display which may be made at the graphical user interface 310 of FIG. 3. This example shows how the inference results may be used to fill in cells with missing text. The graphical user interface display shows a data grid 500 comprising cells arranged in columns and rows. An individual row may be used to represent an object and an individual column may be used to represent a property of an object. The parsing inference component learns probability distributions over the properties and these inference results may be used to complete missing property values, identify errors in property values and suggest corrections to errors in property values.

In this example the columns are labeled A, B, C and D and the rows are numbered 0 through 6. More rows and columns may be displayed by moving scroll bars. Cells containing data which has been entered by a user are filled with small dots. The user filled cells are A1, A2, A3, A4, A5, B1, B6. In this example the cells in column A in rows 1 to 6 contain names of US Presidents and the cells in column B in rows 1 to 6 contain dates. The names of the US Presidents are values of a property. The dates in column B rows 1 to 6 are values of another property. The parsing inference component has been used to fill data in cells A6, B0, B2, B3, B4, B5. For example, a user may wish to find the dates of birth of some US Presidents. He or she may enter a name of one US president in cell A1 and the date of birth of that president in cell B1. The user then enters names of other US presidents in cells A2 to A5. The parsing inference component fills in the title of column B which is "was born on" in row B0 and also fills in dates of birth for the other presidents in column B (using the same format as for the example the user input). A small "?" symbol may be displayed in the cells containing data from the parsing inference component. The level or shading or the color of this symbol may be used to denote how certain the completed data is. Other symbols or representations of the certainty may be used.

A user is also able to enter a date of birth, such as 8 May 1884, in cell B6 and obtain the name "Harry Truman" from the parsing inference component in cell A6. A user is able to enter some text in a column header in order to obtain property values in that column. For example a user may enter "born on" in a new column and obtain property values in that column.

The parsing inference component 306, in some examples, is arranged to correct spelling errors or typing errors either in data input by the user or in data obtained by the observation tool. This is achieved by using the probability distributions learnt for the properties to identify property values with high uncertainty and to propose replacement property values which have improved certainty. Knowledge of typical errors may also be used to identify and correct spelling errors and typing errors.

FIG. 6 is a schematic diagram of the example graphical user interface of FIG. 5 where a user has selected the "?" symbol in cell B3. A pop up display window 600 is provided which shows the complete observations found by the observation tool which support the value displayed in B3. Details of the observations may be displayed such as a link to the document from which the observation was extracted, neighboring text from the document, a title of the document. In addition, alternative values can be shown, which were computed to have lower probability than the displayed value, along with details of the observations supporting each alternative value. This allows the user to inspect each alternative value and the supporting text and decide for themselves which value to use in the completed table. In the example of FIG. 6 the alternative value 19 Aug. 1945 is shown with one example observation supporting this alternative value.

An example of a probabilistic program for use in compiled form in the parsing inference component of FIG. 3 is now given. This is one example only and many others are possible.

DateTime date=Dates.Uniform( );
string template="{0}"+Strings.Uniform( )+"{1}";
string name=Chars.Upper( )+Strings.Lower( )+" "+Chars.Upper( )+Strings.Lower( )
string datestr=dateToString(date);
string c=String.Format(template, name, datestr);
This probabilistic program generates text of the form:
Name "was born on" date where "was born on" is an example plausible template. It comprises a variable denoted date whose value is represented by a uniform distribution over dates (note that the variable denoted date is not in string form but instead is converted to a string later in the process). It comprises a variable denoted template which is represented as a uniform distribution over strings which take the form: first argument "anything" second argument where the first argument is denoted {0} and the second argument is denoted {1}. It comprises a variable denoted name which is structured like a name in that it is formed from an unknown uppercase character followed by a lowercase string, a space and then another uppercase character and lowercase string. It comprises a variable datestr which takes the uncertain string value produced by the function DateToString with the argument date. A variable c takes the result of an operation on strings called String.Format which combines the arguments name and dateStr using the template argument.

The parsing inference component with a compiled form of the above probabilistic program may be used to find people's birth dates. One example is taken, for example, from user input at graphical user interface 310. In the example illustrated in FIG. 5 the example is name=Barack Obama; date=4 Aug. 1961. These instances of the variables name and date are used by the observation tool to obtain complete examples of text. For example, the query "Barack Obama 4 Aug. 1961" is sent to a search engine to obtain a list of documents. The parts of these documents containing the search terms are then used as observations of the variable c. These observations are used to carry out inference and so update the probability distributions associated with the probabilistic variables. For example, the distribution over the variable template may be updated to take the form of an ordered mixture distribution illustrated schematically as:

50% {0} was born on {1}
25% {0} born {1}
12% {0} date of birth {1}
...

Where observed examples of the template are ranked by frequency of occurrence and the mixture can be represented as an automaton.

When a user submits a new name, for example, by inputting Bill Clinton in cell A3 of FIG. 5 the new name information is input via factor node 710 to update the probability distribution at variable node 718 to be a point mass on the value "Bill Clinton". The message passing may then be executed to update the other probability distributions of the factor graph. After the update is complete the probability distribution for the date variable 720 represents the date the Bill Clinton was born, along with any uncertainty in that date.

Figure 7:
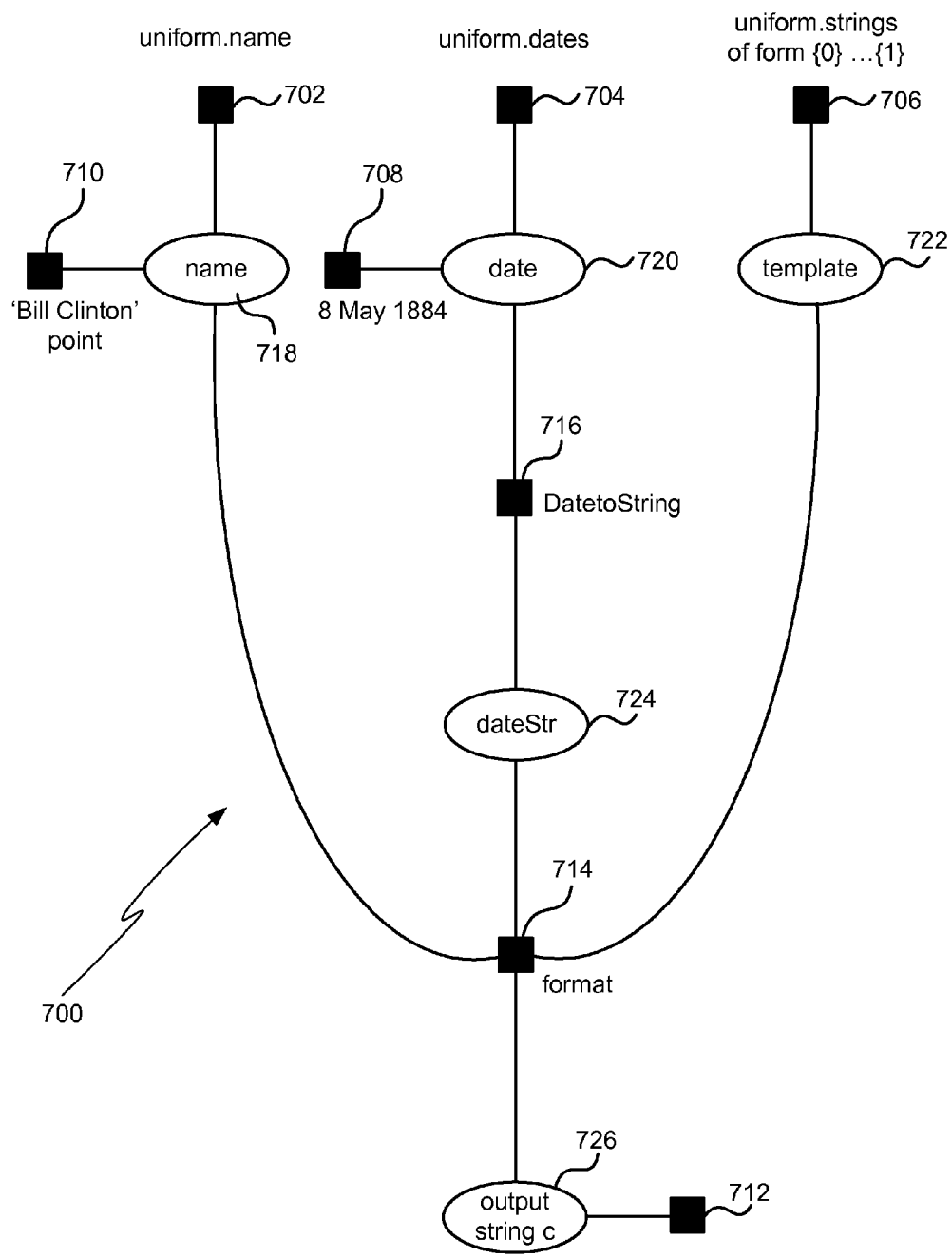
FIG. 7 is a schematic diagram of an example of a factor graph of a probabilistic program.

FIG. 7 is a schematic diagram of a factor graph 700 representing the probabilistic program mentioned above which generates text of the form:

Name "was born on" date

The factor graph comprises one variable node for each variable in the probabilistic program. So the variable name has variable node 718, the variable date has variable node 720, the variable template has variable node 722, the variable dateStr has variable node 724 and the output string c has variable node 726. Factor nodes (shown as squares in FIG. 7) have associated message operators that compute the messages to each neighboring variable from the messages received by that factor. Where these messages are distributions over sequences, they will be of the form of stochastic automata. For example, the variable node Name 718 receives a probability distribution from factor node 702 which is a uniform probability distribution over strings which represent names. In situations where a particular name is observed the variable node Name 718 receives a probability distribution from factor node 710 as a point mass representing the particular known name.

In the same way, the variable node Date 720 receives a probability distribution from factor node 704 which is a uniform probability distribution over dates. In situations where a particular date is observed the variable node date 720 receives a probability distribution from factor node 708 as a point mass representing the probability of the particular date.

The variable node template 722 receives a probability distribution from factor node 706. The probability distribution may be uniform over strings of the particular format.

A factor node DateToString 716, transforms the probability distribution over dates from variable node 720 into a probability distribution over strings that represent dates. A factor node format 714, takes probability distributions from variable nodes 718, 714 and 722 and transforms them to create a probability distribution over the output string 726 which is stored at variable node 726.

Message passing may occur. For example, an output string 726 is observed and a probability distribution for the observed string generated by factor node 712 and passed to variable node 726. Format factor node 714 takes the new probability distribution at node 726 and uses it to pass messages to variable nodes 718, 724 and 722 which updates the probability distributions at those variable nodes. Messages may also pass from dateToString factor node 716 to the date variable node 720, updating the probability distribution over the date. In this way knowledge from observed examples is used to update the probability distributions at the variable nodes and so complete partial examples or update the template distribution so as to improve retrieval performance when new partial examples are received from factor nodes 710 and 708.

The factor graph of FIG. 7 is one example only. It may be extended by adding more factor nodes and variable nodes. For example, factor nodes representing other operations on strings may be used. For example, variable nodes representing other properties may be added such as for the first lady of each president, the place of birth of each person or other values. Note that the top part of the factor graph of FIG. 7 operates with property values such as dates, places, names, times, quantities which are often not strings. Any non-string values are converted to strings using an appropriate factor node (such as the factor node 716 in the example of FIG. 7). In this way the lower part of the factor graph operates only with strings.

Where the parsing inference component dynamically generates the probabilistic program it may do this according to the structure of input data, such as any rows and columns of data input using graphical user interface 310. For example, a variable node may be created for each cell representing the value of that column's property for that row's item. Any variable nodes for which the column data is not of the type string are connected to appropriate factor nodes to convert the property values of that column into strings or other ordered sequences of items. A variable node is created and connected to the factor node to hold the results of the conversion to strings. The variable nodes are connected together using one or more factor nodes such as factor node 714 of FIG. 7 according to one or more string operations.

As mentioned above, the message operators may be implemented using stochastic transducers and the probability distributions may be represented using stochastic automata. Examples of stochastic automata are given in FIG. 8 which shows a stochastic automaton 800 for a probability distribution over strings which are structured as a person's name. A first node 800 represents an event which is generating an initial letter of a person's first name which is a capital letter selected uniformly from the alphabet A to Z as indicated. A second node 804 represents generating a second and subsequent lower case characters of the person's first name where the characters are from the alphabet a to z as indicated and the probability of generating a lower case character is 0.8. It is also possible for second node 804 to generate a space as indicated by the arrow from the second node 804 to node 806 labeled with the probability 0.2. The probabilities on edges leaving a node sum to 1. A third node 806 represents generating a first letter of the person's surname which is a capital letter from the alphabet A to Z as indicated. The final node 808 represents generating a second and subsequent lower case characters of the person's surname (with probability 0.7 in this example) where the characters are from the alphabet a to z as indicated and represents ending the process with a probability of 0.3 in this example.

Figure 8:
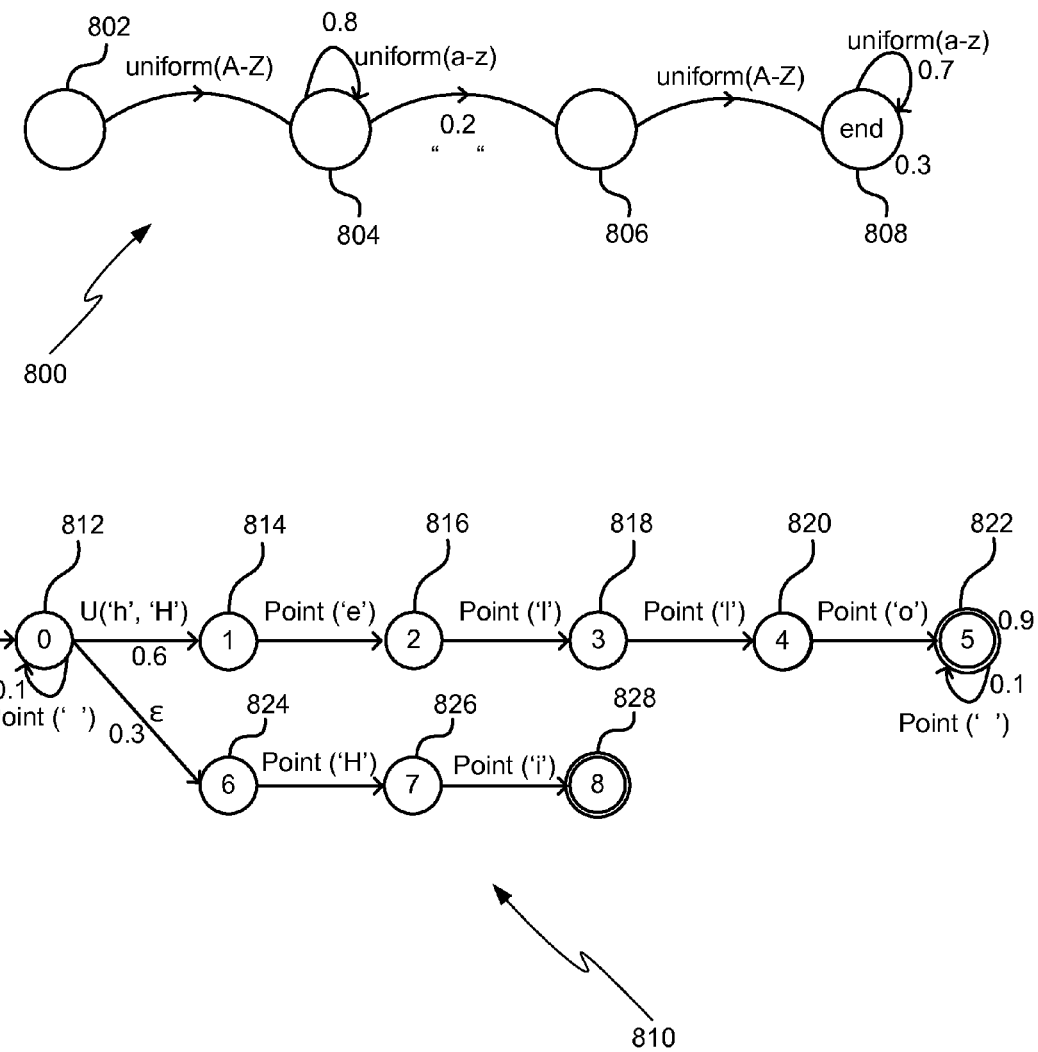
FIG. 8 is a schematic diagram of two example stochastic automata representing probability distributions over strings.

FIG. 8 also shows stochastic automaton 810 for generating the strings "Hello", "hello" or "Hi" surrounded by any number of spaces. The stochastic automaton start node is node 812 which may generate any of three actions as it has three edges which leave it. With probability 0.1 it generates a space according to a point mass, with probability 0.3 it takes no action (as indicated by epsilon edge to node 824) and with probability 0.6 it generates either the character h or the character H according to a uniform distribution over those two characters. The node 814 generates the character e according to a point mass, the node 816 generates the character l according to a point mass, the node 818 generates the character l according to a point mass and the node 820 generates the character o according to a point mass. The node 822 generates spaces (with a probability of 0.1 on the edge in this example) according to a point mass or ends the process with a probability of 0.9 as indicated by the double circle of this node.

The node 824 generates the character H according to a point mass, the node 826 generates the character i according to a point mass and the node 828 ends the process.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), graphics processing units (GPUs).

Figure 9:
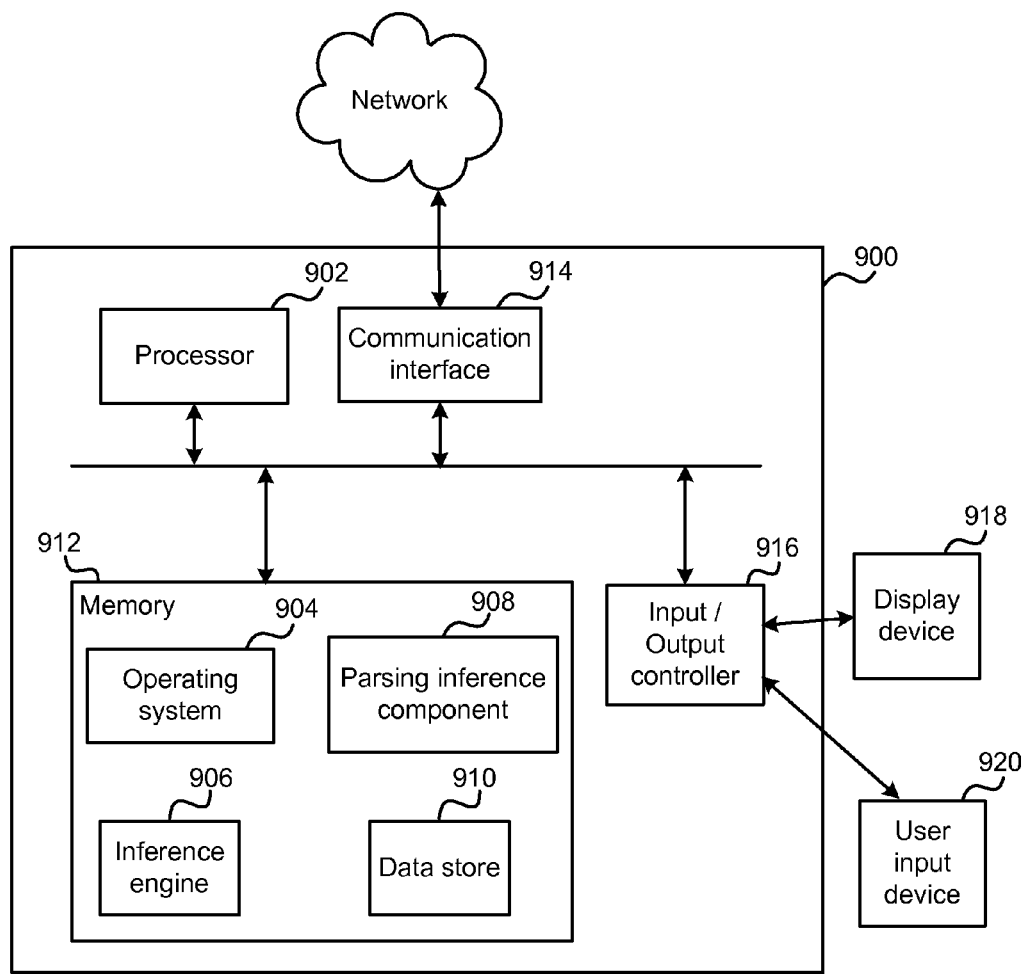
FIG. 9 illustrates an exemplary computing-based device in which embodiments of a parsing inference component and/or an inference engine may be implemented.

FIG. 9 illustrates various components of an exemplary computing-based device 900 which may be implemented as any form of a computing and/or electronic device, and in which embodiments of a parsing inference component 100, 306 may be implemented.

Computing-based device 900 comprises one or more processors 902 which may be microprocessors, controllers or any other suitable type of processors for processing computer executable instructions to control the operation of the device in order to infer structure of ordered sequences of items such as text. In some examples, for example where a system on a chip architecture is used, the processors 902 may include one or more fixed function blocks (also referred to as accelerators) which implement a part of the methods described herein in hardware (rather than software or firmware). Platform software comprising an operating system 904 or any other suitable platform software may be provided at the computing-based device to enable a parsing inference component 908 (and optionally an inference engine 906), to be executed on the device. In some examples the inference engine 906 is not present at the device and may be accessed via communication interface 914. Data store 910 may be provided and may store observations, addresses of observation sources, probability distributions, and other data.

The computer executable instructions may be provided using any computer-readable media that is accessible by computing based device 900. Computer-readable media may include, for example, computer storage media such as memory 912 and communications media. Computer storage media, such as memory 912, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 912) is shown within the computing-based device 900 it will be appreciated that the storage may be distributed or located remotely and accessed via a network or other communication link (e.g. using communication interface 914).

The computing-based device 900 also comprises an input/output controller 916 arranged to output display information to a display device 918 which may be separate from or integral to the computing-based device 900. The display information may provide a graphical user interface. The input/output controller 916 is also arranged to receive and process input from one or more devices, such as a user input device 920 (e.g. a mouse, keyboard, camera, microphone or other sensor). In some examples the user input device 920 may detect voice input, user gestures or other user actions and may provide a natural user interface (NUI). This user input may be used to create, edit, delete, manipulate probabilistic programs, input observations, specify sources of observations, interact with graphical user interface 310, and for other methods as described herein. In an embodiment the display device 918 may also act as the user input device 920 if it is a touch sensitive display device. The input/output controller 916 may also output data to devices other than the display device, e.g. a locally connected printing device.

The input/output controller 916, display device 918 and optionally the user input device 920 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method of parsing ordered sequences of items comprising:
   accessing, at a processor, a process for generating ordered sequences of items, the process having one or more probability distributions representing possible ordered sequences of items involved in the process;
   receiving, at the processor, at least one example of at least part of an ordered sequence of items compatible with the probabilistic process;
   updating the one or more probability distributions by carrying out inference using the at least one example; and
   outputting information about the one or more probability distributions.

2. A method as claimed in claim 1 where the items are characters and the ordered sequences of items are strings.

3. A method as claimed in claim 1 where the process also comprises at least one uncertain variable of a type selected from any of: Boolean variables, integer variables, double variables, date variables, compound variables containing multiple properties.

4. A method as claimed in claim 1 where the process comprises one or more operations from a specified plurality of operations for generating an ordered sequence of items; at least one operation having at least one argument which is itself an operation represented by a probability distribution over an ordered sequence of items.

5. A method as claimed in claim 1 where the process uses one or more stochastic automata to represent the probability distributions and generate the ordered sequence of items.

6. A method as claimed in claim 1 comprising updating the one or more probability distributions by updating stochastic automata using stochastic transducers.

7. A method as claimed in claim 1 wherein accessing the process comprises accessing a compiled probabilistic program comprising message passing algorithms arranged to update the probability distributions by updating stochastic automata using stochastic transducers.

8. A method as claimed in claim 1 comprising using the at least one example and the one or more probability distributions to obtain complete examples of ordered sequences of items compatible with the probabilistic process.

9. A method as claimed in claim 8 comprising updating the one or more probability distributions by carrying out inference using the complete examples.

10. A method as claimed in claim 1 comprising using the updated probability distributions to complete a partial example, the partial example being of an object having a plurality of properties, at least one of which is known and at least one of which is unknown, and where using the updated probability distributions to complete the partial example comprises computing values of at least one of the unknown property values.

11. A method as claimed in claim 10 comprising using the updated probability distributions to compute a certainty of the completed partial example and displaying information about the computed certainty.

12. A method as claimed in claim 1 comprising using the at least one example and the one or more probability distributions to obtain complete examples of ordered sequences of items compatible with the probabilistic process; and displaying information about sources of the complete examples.

13. A method of parsing strings comprising:

accessing, at a processor, a process for generating strings, the process having one or more probability distributions representing possible strings involved in the process;

receiving, at the processor, at least one partial example; updating the one or more probability distributions by carrying out inference using the at least one partial example; and using the updated probability distributions to complete the at least one partial example.

14. A method as claimed in claim 13 comprising obtaining a plurality of complete examples of strings compatible with the process by using the at least one partial example and the probability distributions to retrieve documents from an information retrieval system.

15. A method as claimed in claim 14 comprising extracting the complete examples from the documents by searching the documents for strings compatible with the process.

16. A method as claimed in claim 14 comprising displaying information about one or more of the retrieved documents.

17. A method as claimed in claim 13 comprising obtaining a plurality of complete examples of strings compatible with the process by using the at least one partial example and the updated probability distributions, and updating the one or more probability distributions by carrying out inference using the complete examples.

18. A parsing inference component comprising a hardware processor and device executable instructions for generating ordered sequences of items, the process using one or more probability distributions representing possible ordered sequences of items involved in the process; the parsing inference component having:

an input controller arranged to receive at least one example of at least part of an ordered sequence of items compatible with the probabilistic process; and where the device executable instructions are arranged to update the one or more probability distributions by carrying out inference using the at least one example.

19. A parsing inference component as claimed in claim 18 comprising a processor arranged to dynamically generate a probabilistic program for generating the ordered sequences of items.

20. A parsing inference component as claimed in claim 18 being at least partially implemented using hardware logic selected from any one or more of: a field-programmable gate array, a program-specific integrated circuit, a program-specific standard product, a system-on-a-chip, a complex programmable logic device, a graphics processing unit.

* * * * *